United States Patent
Azmat et al.

(10) Patent No.: US 9,305,147 B1
(45) Date of Patent: Apr. 5, 2016

(54) PREVENTING LICENSE EXPLOITATION USING VIRTUAL NAMESPACE DEVICES

(71) Applicant: Flexera Software LLC, Itasca, IL (US)

(72) Inventors: Haroon Azmat, Maidenhead (GB); Charles Tonkinson, Henley-on-Thames (GB)

(73) Assignee: FLEXERA SOFTWARE LLC, Itasca, IL (US)

( * ) Notice: Subject to any disclaimer, the term of this patent is extended or adjusted under 35 U.S.C. 154(b) by 0 days.

(21) Appl. No.: 14/733,871

(22) Filed: Jun. 8, 2015

(51) Int. Cl.
*G06F 21/12* (2013.01)
*G06F 21/10* (2013.01)

(52) U.S. Cl.
CPC ............ *G06F 21/121* (2013.01); *G06F 21/105* (2013.01)

(58) Field of Classification Search
CPC .............................. G06F 21/121; G06F 21/105
See application file for complete search history.

(56) References Cited

U.S. PATENT DOCUMENTS

| | | | | |
|---|---|---|---|---|
| 8,683,560 B1* | 3/2014 | Brooker | ................... | G06F 21/44 713/155 |
| 2008/0134176 A1* | 6/2008 | Fitzgerald | ........... | G06F 9/45537 718/1 |
| 2008/0271016 A1* | 10/2008 | Chess | ........................ | G06F 8/63 718/1 |
| 2009/0328225 A1* | 12/2009 | Chambers | ............... | G06F 21/10 726/26 |
| 2010/0205303 A1* | 8/2010 | Chaturvedi | ........... | G06F 21/126 709/226 |
| 2010/0250730 A1* | 9/2010 | Menzies | ................ | G06F 21/105 709/224 |
| 2011/0197062 A1* | 8/2011 | De Gaetano | ............ | H04L 63/10 713/167 |
| 2012/0110571 A1* | 5/2012 | Smith | ...................... | G06F 9/445 718/1 |
| 2014/0189685 A1* | 7/2014 | Kripalani | .................. | G06F 8/65 718/1 |

OTHER PUBLICATIONS

Petrlic et al., Privacy-Preserving Digital Rights Management in a Trusted Cloud Environment, Jun. 2012, 11th International Conference on Trust, Security and Privacy in Computing and Communications, pp. 958-963.*

* cited by examiner

*Primary Examiner* — Kenneth Chang
(74) *Attorney, Agent, or Firm* — Perkins Coie LLP

(57) ABSTRACT

Some embodiments include a method of preventing software licensing exploitation in a virtual environment. The method includes: retrieving, by a first instance of a licensed application running on an original virtual machine as permitted by an original software license, an original unique identifier from a virtual device in the original virtual machine; creating, by a hypervisor of the virtual environment, a cloned virtual machine instance as a copy of the original virtual machine; retrieving, by a second instance of the licensed application running on the cloned virtual machine instance, a new unique identifier from a virtual device in the cloned virtual machine instance; and determining, by the second instance of the licensed application running on the cloned virtual machine instance, that the original software license does not apply to the cloned virtual machine instance because the new unique identifier is different from the original unique identifier.

22 Claims, 8 Drawing Sheets

PREVENTING LICENSE EXPLOITATION USING VIRTUAL NAMESPACE DEVICES

RELATED FIELD

At least one embodiment of this disclosure relates generally to inventory tracking or license management systems, and in particular, methods and systems to prevent software licensing exploits in virtual machine environment using virtual namespace devices.

BACKGROUND

There is an increasing demand for efficient software licensing management and accurate inventory tracking. Software licensors grant software licenses to software users and track the computers running software legitimately under the licenses. On the other hand, a growing number of enterprises are implementing virtual machine technology to incorporate visualization into their computer environments and to consolidate the server usage. However, emerging virtual machine technology raises new challenges to software licensing.

A virtual machine is an emulation of a computer system that imitates dedicated hardware. The end user of the a virtual machine can have the same user experience on the virtual machine as he or she would have on a dedicated hardware machine. Because virtual machines are software emulations of dedicated hardware machines, it is easy to create snapshots or clones of virtual machines. A snapshot is a copy of a virtual machine at a given point in time. The snapshot can be used to restore the virtual machine to that particular point in time. Therefore, if a software license restricts a virtual machine to use a software application until a certain time point, an exploiter can continue to use the software despite of the time limitation of the license since the virtual machine can be reverted back to an earlier state using a snapshot.

Similarly, multiple clones (copies) of a virtual machine can be made from a single virtual machine. Since it is difficult to track and differentiate between the clones of the virtual machine, an exploiter can run multiple copies of a software application on the clones despite that the software license restricts the usage of the software application to a single machine.

Avoiding exploitation of software licenses can recover lost profits for a software licensor. However, software vendors struggle to implement licensing management technology that takes virtual machine technology into account. It is a challenge to identify and differentiate copies of virtual machine instances for license tracking purpose.

SUMMARY

Disclosed is a mechanism for software license monitoring and enforcement using virtual machine namespace devices. The virtual machine namespace devices include unique identifiers for uniquely identifying virtual machine instances for inventory tracking. By comparing the identifiers of the virtual machine instances, a software license management system can prevent license leakage, when a time shift event occurs in a virtual environment thorough a virtual machine operation such as clone or snapshot.

By comparing the current identifier of the current virtual machine instance with a previous identifier of the an original virtual machine, the system is able to identify a cloned virtual machine instance or a reverted virtual machine instance based on a snapshot. The system prevents the cloned virtual machine instance from using a software application under the original software license, since the original software permits only the original virtual machine to use the software application. The system also requires a license server running on a reverted virtual machine instance (based on the snapshot) to confirm the legitimacy of the available licenses before granting those licenses to machines.

The software license management system also allows seamless license usage by a migrated virtual machine, as a migration event does not change the unique identifier for the virtual machine being migrated.

Some embodiments of this disclosure have other aspects, elements, features, and steps in addition to or in place of what is described above. These potential additions and replacements are described throughout the rest of the specification

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
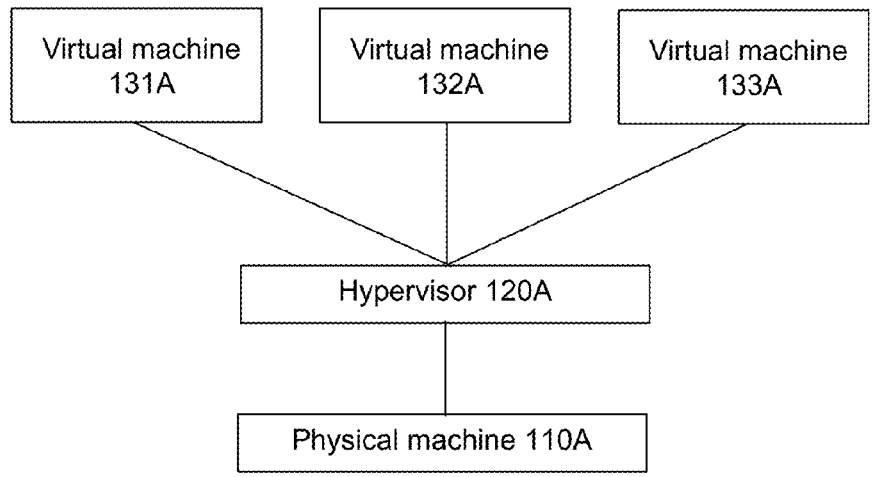
FIGS. 1A and 1B are block diagrams illustrating two types of hypervisor for managing and monitoring virtual machines, according to various embodiments.
Figure 1B:
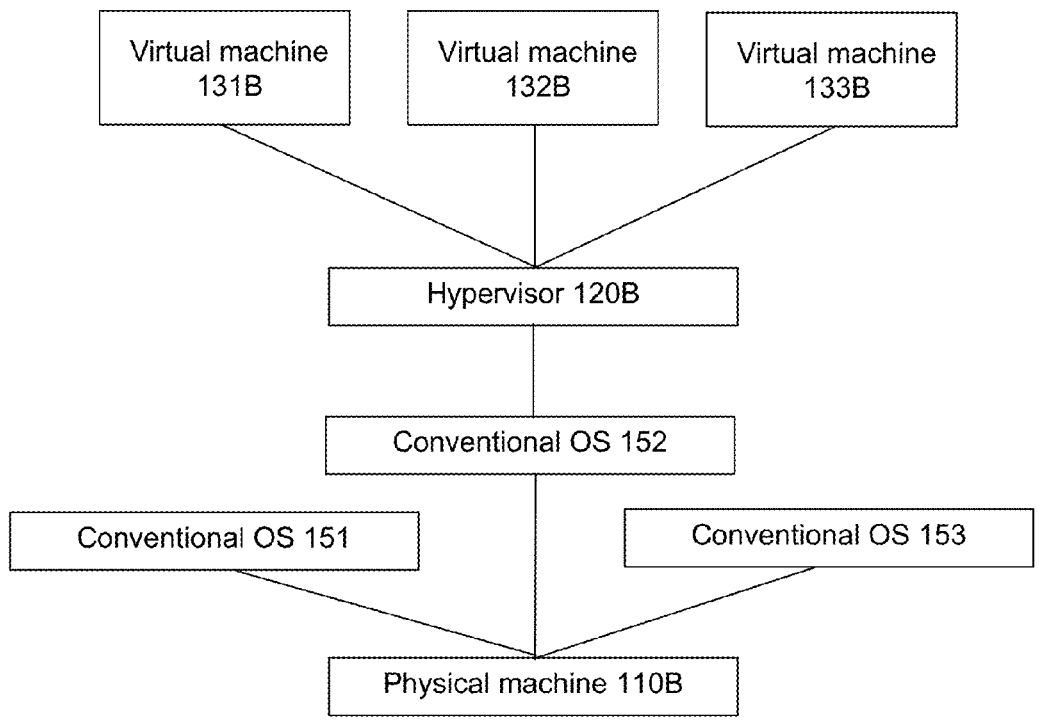

FIGS. 1A and 1B illustrate two types of hypervisor for managing and monitoring virtual machines, according to various embodiments. A hypervisor (also referred to as "virtual machine monitor" or "virtual machine manager") is a piece of computer software, firmware, hardware, or a combination thereof that creates and runs virtual machines. A hardware machine, on which a hypervisor runs virtual machines, is defined as a host machine. The virtual machines are called guest machines. The hypervisor presents the guest operating systems of the guest machines with a virtual operating platform and manages the execution of the guest operating systems. Multiple instances of guest operating systems can share the virtualized hardware resources supported by the hardware machine.

One type of hypervisor is bare-metal hypervisor (also referred to as "type-1 hypervisor" or "native hypervisor"), as illustrated in FIG. 1A. The bare-metal hypervisor 120A runs directly on the host physical machine 110A (hence the name "bare-metal"). The guest operating systems of the virtual machines 131A, 132A and 133A run as processes on the host physical machine 110A via the hypervisor 120A. Examples of bare-metal hypervisors include Microsoft Hyper-V, Citrix XenServer, VMware ESX/ESXi, Oracle VM Server, etc.

Another type of hypervisor is hosted hypervisor (also referred to as "hype-2 hypervisor"), as illustrated in FIG. 1B. One or more conventional operating systems 151, 152 and 153 run on the host physical machine 110B. The hosted hypervisor 120B runs on the convention operating system 152 as a computer program. The guest operating systems of the virtual machines 131B, 132B and 133B run on top of the conventional operating system 152 via the hypervisor 120B. Examples of hosted hypervisor include VMware workstation and VirtualBox.

There are also hybrid types of hypervisor. For example, Linux's Kernel-based Virtual Machine (KVM) and FreeBSD's bhyve are kernel modules that effectively convert the host operating systems to type-1 bare-metal hypervisors. Nevertheless, the Linux and FreeBSD operating systems are still conventional general-purpose operating systems. The KVM and bhyve hypervisors compete with other applications for virtual machine resources, which can be also categorized as type-2 hosted hypervisors.

A hypervisor of a virtual environment can manage and modify a system namespace at the operating system level of a virtual machine. The system namespace identifies and maintains system devices for the operating system of the virtual machine. The system devices in the system namespace (also referred to as "system namespace devices") can include virtualization of underlying physical devices, as well as virtual devices (also referred to as "virtual appliances") that have no support from any underlying physical devices (other than the physical processor executing instructions) and does not emulate any physical component of the physical machine. For example, in some embodiments, the hypervisor can creates a virtual device and injects the virtual device into a system namespace of a virtual machine. In some other embodiments, the hypervisor can instruct an operating system of a virtual machine to create a virtual device in the namespace of the virtual machine.

Disclosed herein is a mechanism for uniquely identifying a virtual machine for inventory tracking purpose when time shift events occur through clone, snapshot or other operations on the virtual machine. Time shift events for a virtual machine, such as cloning or snapshotting, can generate multiple instances of the virtual machine. The mechanism disclosed herein is able to identify each unique instance of the virtual machine that runs on a virtual environment.

Each instance of the virtual machine is uniquely identified across virtual platforms and across hypervisors. In other words, each instance of the virtual machine is uniquely identified across all virtual machines in the world. The unique identification is independent to the virtual environment and independent of the operating system of virtual machine instances.

There are various operations available for manipulating instances of virtual machines in the virtual environment. Three common operations are clone, snapshot and migration operations.

During a migration operation, the hypervisor moves a virtual machine from a physical machine managed by a hypervisor to another physical machine managed by another hypervisor. Migration can be either live or cold. A live migration refers to a process of moving a running virtual machine between physical machines without disconnecting the client(s). A cold migration process disconnects the clients, stops or halts the virtual machine, and then moves the virtual machine to a new physical machine. During a migration operation, no new instance of the virtual machine is created. The same instance of the virtual machine is moved to a new physical machine. After the migration operation, the virtual environment of the original physical machine no longer include that instance of the virtual machine.

During a clone operation, a hypervisor of the virtual environment creates a new virtual machine instance of an existing virtual machine. During a snapshot operation, the hypervisor creates a time-based copy of a virtual machine instance. When the hypervisor conducts a clone or snapshot operation, the hypervisor creates a new instance of the existing virtual machine. In other words, a separate virtual machine instance is created in the virtual environment managed by the hypervisor.

A cloned virtual machine instance is a new virtual machine that is a copy of the original virtual machine. The cloned virtual machine and the original virtual machine can both continue to run and evolve into states that are different from each other. A snapshot is a point-in-time backup for a state of the original virtual machine. The snapshot allows reverting the virtual machine to a previous state at a particular point in time.

The identification mechanism disclosed herein needs to differentiate between the migration operation and the clone or snapshot operation. During a migration operation, the original virtual machine instance and the migrated virtual machine instance should be identified as the same virtual machine instance. In other words, for the migration operation, the identifier of the virtual machine follows the virtual machine as it migrates to another physical machine.

In contrast, during a clone operation, the original virtual machine instance and the cloned instance of the virtual machine should be identified as two separate virtual machine instances. Similarly, during a snapshot operation, the original virtual machine instance and the reverted virtual machine instance based on the snapshot should be identified as two separate virtual machine instances. In other words, for the clone or snapshot operation, a new identifier is assigned to newly cloned or snapshot instance of the virtual machine, while the original virtual machine instance still keeps the original identifier.

By comparing the current identifier of the current virtual machine instance with a previous identifier of the an original virtual machine, the system is able to identify a cloned virtual machine instance or a reverted virtual machine instance based on a snapshot. The system can prevent the cloned or reverted virtual machine instance from using a software application under the original software license, if the original software permits only the original virtual machine to run the software application.

Figure 2:
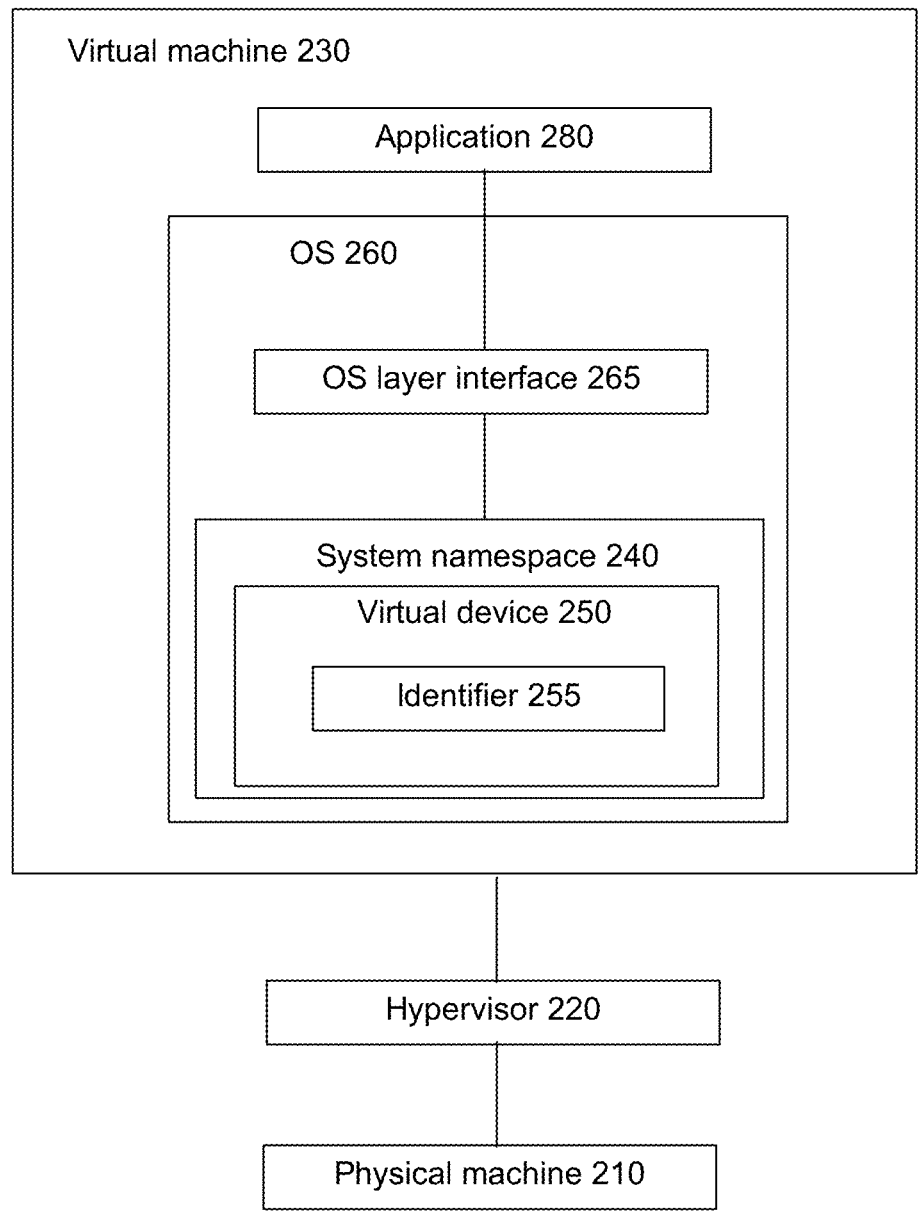
FIG. 2 is a block diagram illustrating a hypervisor that injects a virtual device into a system namespace of a virtual machine, according to various embodiments.

A virtual device is used as a vehicle for communicating the unique identifiers among the virtual machine instances and the hypervisor. FIG. 2 illustrates a hypervisor that injects a virtual device into a system namespace of a virtual machine, according to various embodiments. The hypervisor 220 monitors and manages the operations of the virtual environment 200. As a result of an operation, for example a clone or snapshot operation, the hypervisor 220 creates a new virtual machine instance 230. Accordingly, the hypervisor 220 also generates an identifier 255 assigned to the virtual machine 230. The identifier 255 can be a globally unique identifier.

Hypervisor 220 continues to monitor and manage the virtual machine 230 running on a physical machine 210. The virtual machine 230 includes a system namespace 240 for identifying and maintaining system devices. The hypervisor 220 can inject a virtual device 250 into the system namespace 240 of the virtual machine 230.

As part of the system namespace 240, the virtual device 250 can bootstrap initialization of the operating system 260 of the virtual machine 230. In other words, when the operating system 260 initializes, the virtual device 250 initializes along with the operating system 260. The virtual device 250 is available for access within the virtual machine 230, after the operating system 260 finishes the initialization process.

The virtual device 250 does not need to have any support from or attachment to any physical component of the physical machine 210, and does not emulate any physical component of the underlying physical machine 210. The virtual device 250 contains the identifier 255 that uniquely identifies the virtual machine 230 and globally differentiates the virtual machine from other virtual machine instances.

The operating system 260 of the virtual machine 230 can provide an operating system layer interface 265 (as referred to as "OS layer interface"). Using the OS layer interface 265, the operating system 260 of the virtual machine 230 can expose the information of the identifier 255 to an application 270 running in the virtual machine 230 at the application level. In other words, the application 270 can retrieve the identifier 255 by accessing the virtual device 250 via the OS layer interface 265. The identifier 255 can include, e.g., a number of bytes. Once the application 270 retrieves the identifier 255, the application 270 can use the retrieved information in its own context. For example, the application 270 can use the identifier 255 to uniquely identify the current instance of the virtual machine 230 at the application level.

In some embodiments, the system namespace 240 can be an Advanced Configuration and Power Interface (ACPI). The virtual device 250 can be a virtual device that conforms to the ACPI namespace device specification. In some embodiments, the virtual device 250 can have a Plug and Play compatible ID (CID). The hypervisor can also execute an ACPI notify operation to notify the state change of newly injected the virtual device 250.

In some embodiments, the identifier 255 can be a Globally Unique Identifier (GUID) or Universally Unique Identifier (UUID), which is a 128-bit value that may or may not be generated from random or pseudo-random numbers. The GUID or UUID mechanism enables generating unique identifiers without any central authority. The total number of such unique GUIDs can be as much as $2^{122}$. The number of unique GUIDs is so large that the probability of the same number being generated randomly twice is negligible.

The GUID or UUID mechanism can also generate the identifiers based on certain information such as Ethernet MAC address. The mechanism does not rely on each machine having a different Ethernet MAC address but that does help to even further ensure that two different UUIDs will not conflict.

An inventory tracking system can use the identifier 255, uniquely identifying the virtual machine 230, to defeat exploits of software (or even hardware) licenses. Common license exploits in virtual environments includes, e.g., exploits involving clone operations (also referred to as "clone exploits") and exploits involving snapshot operations (also referred to as "snapshot exploits").

A clone exploit is a license exploit of illegitimately obtaining more licenses by using a hypervisor to create clones of an original virtual machine. In one example, there is a license permitting usage of a software on one and only one machine (either a virtual machine or a physical machine); and there is already a virtual machine running the software legitimately under the license. The hypervisor then creates clones of the original virtual machines. If there is no mechanism to uniquely identifying the original virtual machine and its clones, a license management system will not be able to differentiate between the original virtual machine and the clones. As a result, the clones of the original virtual machine will be able to run the software without rejection from the license management system, even that the license permits only one machine to use the software.

If the system can uniquely identify the original virtual machine that the licensed application runs and the clones of the virtual machine, the system is able to defeat the clone exploit. For example, if the original virtual machine and the clones have different unique identifiers, a licensed application can check the unique identifiers and determine whether the license is legitimate.

Figure 3:
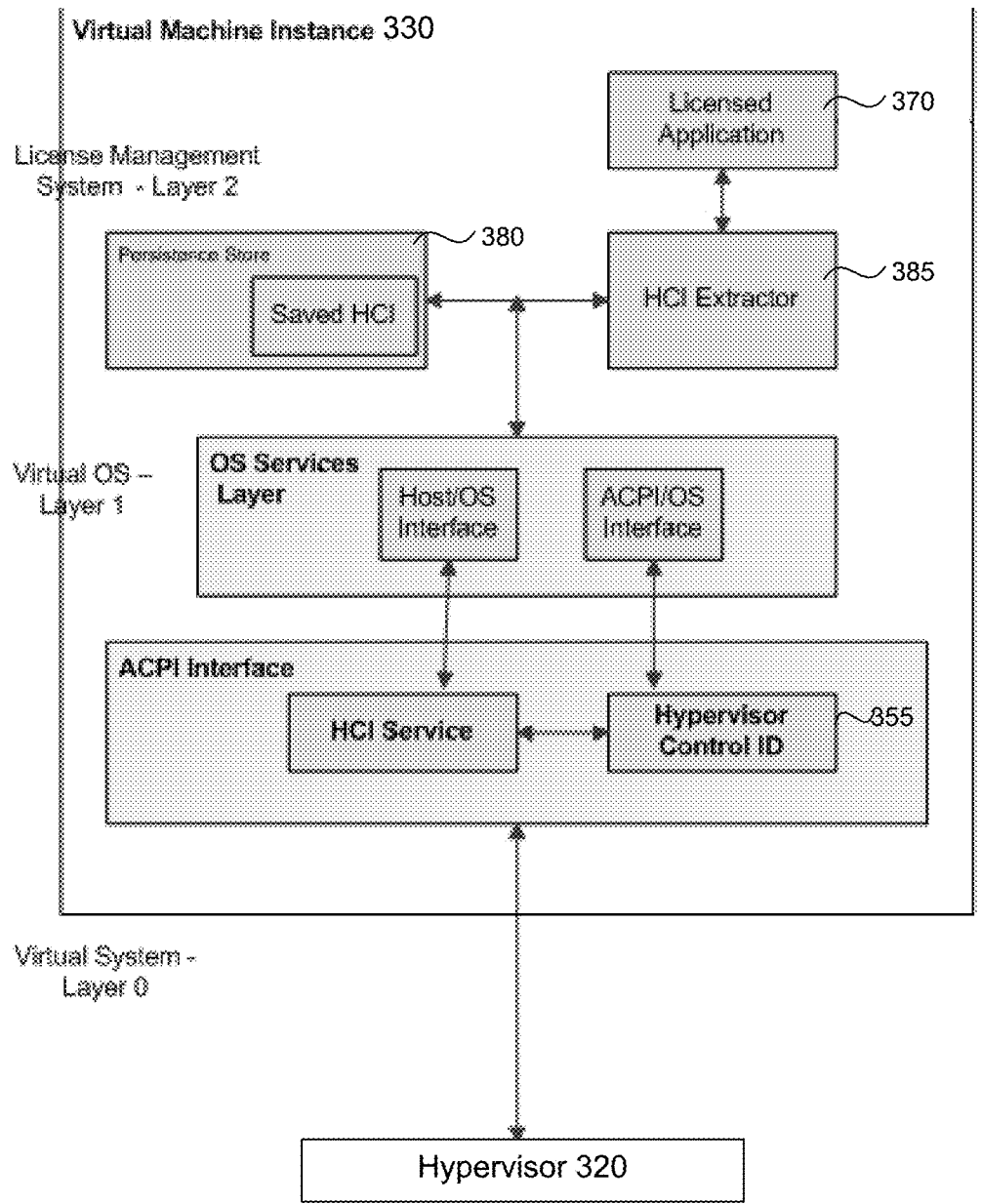
FIG. 3 is a block diagram illustrating a virtual environment for preventing license exploitation using virtual machine clones, according to various embodiments.

FIG. 3 illustrates a virtual environment for preventing license exploitation using virtual machine clones, according to various embodiments. A hypervisor 320 creates a new virtual machine instance 330 as a clone of an original virtual machine, and generates a hypervisor control ID (HCI) 355 that uniquely identifies the new virtual machine instance 330. The hypervisor 320 injects a virtual device containing the hypervisor control ID 355 into the new virtual machine instance 330, before the hypervisor initializes the new virtual machine instance 330.

The licensed application 370 uses an HCI extractor 385 to retrieve the HCI 355 from the virtual device of the virtual machine instance 330 and stores the HCI 355 in a virtual persistence store 380. The licensed application 370 compares the HCI 355 for the new virtual machine instance 330 with an original hypervisor control ID for the original virtual machine. If those two HCIs are different, the licensed application cannot continue to run on the new virtual machine instance under the original software license, since the original software license permits only the original virtual machine to run the licensed application.

Besides clone exploit, there is also snapshot exploits in the virtual environment. A snapshot exploit is a license exploit of using favorable license store to illegitimately obtain more license, as the snapshot allows reverting a virtual machine to an earlier state. For example, there is a licensing server of the license management system that has five licenses, for permission of using a software application on five different machines. The licensing server, running on a virtual server, can store the five licenses in a virtual persistent data store (also referred to as "virtual persistence store") in a virtual machine. The hypervisor conducts a snapshot operation to create a snapshot of the virtual machine, which contains five licenses in its storage.

Then the licensing server grants five licenses to five machines. Accordingly the licensing server reduces the number of licenses in the virtual persistent data store to zero. Then the hypervisor conducts a revert operation to use the snapshot to revert the virtual machine back to a previous state. In that previous state, the virtual machine still contains five licenses in its storage. Again, the license server then has another five licenses to distribute. Therefore, the license server practically can grant licenses to ten different machines. Furthermore, the hypervisor can continue to conduct more reversion operations to obtain more licenses. Therefore, the license server can grant an unlimited number of licenses, even that the licensing agreement only permits usage of the software on five machines.

If the license server can uniquely identify the original virtual machine that the license server runs and the snapshot of the virtual machine, the license server is able to defeat the license exploit. For example, if the original virtual machine and the snapshot have different unique identifiers, the license server after the reversion operation will be able to determine that the license server is running on a virtual machine that has been reverted back to a previous state. As a result, the license server determines that the licenses in the virtual persistent data store may have already be granted to one or more machines. The license server needs to conduct an inquiry (e.g., an external inquiry to the license management system, or internal inquires to virtual machine instances) to ensure that the licenses have not been granted before continuing granting the licenses.

Figure 4:
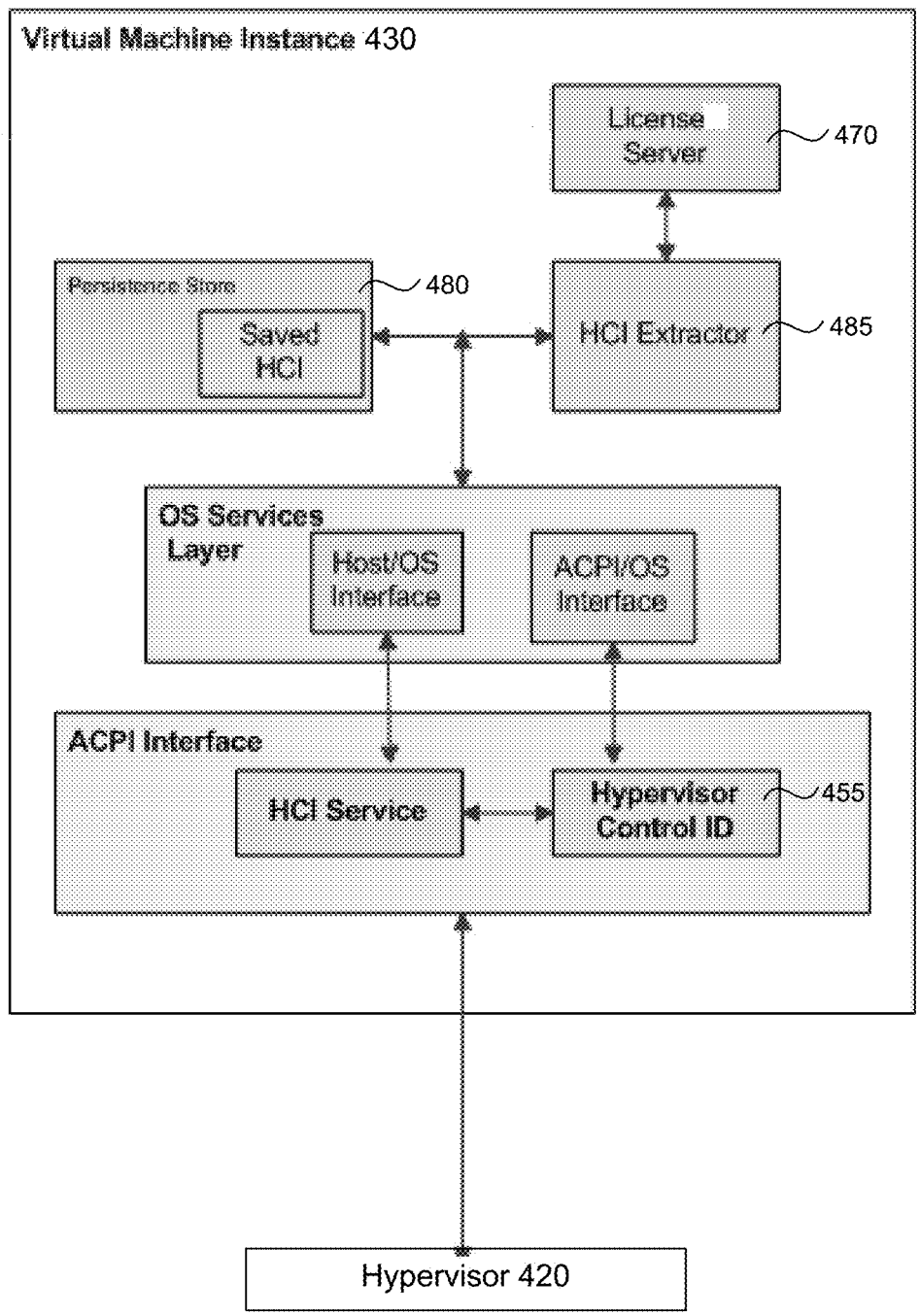
FIG. 4 is a block diagram illustrating a virtual environment for preventing license exploitation by reverting back virtual machines using snapshots, according to various embodiments.

FIG. 4 illustrates a virtual environment for preventing license exploitation by reverting back virtual machines using snapshots, according to various embodiments. A hypervisor 420 reverts back an original virtual machine to a reverted virtual machine instance 430 based on a snapshot of the original virtual machine. The hypervisor further generates a hypervisor control ID (HCI) 455 that uniquely identifies the reverted virtual machine instance 430. The hypervisor 420 injects a virtual device containing the hypervisor control ID 455 into the new virtual machine instance 430, before the hypervisor initializes the reverted virtual machine instance 430.

The license server 470 uses an HCI extractor 485 to retrieve the HCI 455 from the virtual device of the virtual machine instance 430 and stores the HCI 455 in a virtual persistence store 480. The license server 470 compares the HCI 455 for the reverted virtual machine instance 430 with an original hypervisor control ID for the original virtual machine. If those two HCIs are different, the license server determines that there is a possibility that some software licenses available to the license server running on the reverted virtual machine had already been granted, and therefore the license server cannot grant those software licenses again.

Assuming the license server running on the original virtual machine stores software licenses in a virtual persistence store of the virtual machine. Then the hypervisor takes a snapshot of the original virtual machine. The snapshot includes the information of the stored software licenses. After the hypervisor takes the snapshot of the original virtual machine, the license server grants a particular software license to a machine and accordingly removes that particular software license from the virtual persistence store so that the license sever running on the original virtual machine cannot grant the particular software license twice.

However, after the hypervisor reverts the original virtual machine to the reverted virtual machine instance 430 using the snapshot. That particular software license is again available in the reverted virtual machine instance 430. By comparing the HCIs of the original virtual machine and the reverted virtual machine instance, the license server 470 running on the reverted virtual machine instance realizes that the particular software license may have already been granted during the lifetime of the original virtual machine (before the snapshotting event), even that the particular software license is still in the reverted virtual machine instance 430. The license server 470 running on the reverted virtual machine instance 430 needs to check with a license management system or other machines to confirm whether the license server 470 still can grant that particular software license to a machine.

Figure 5:
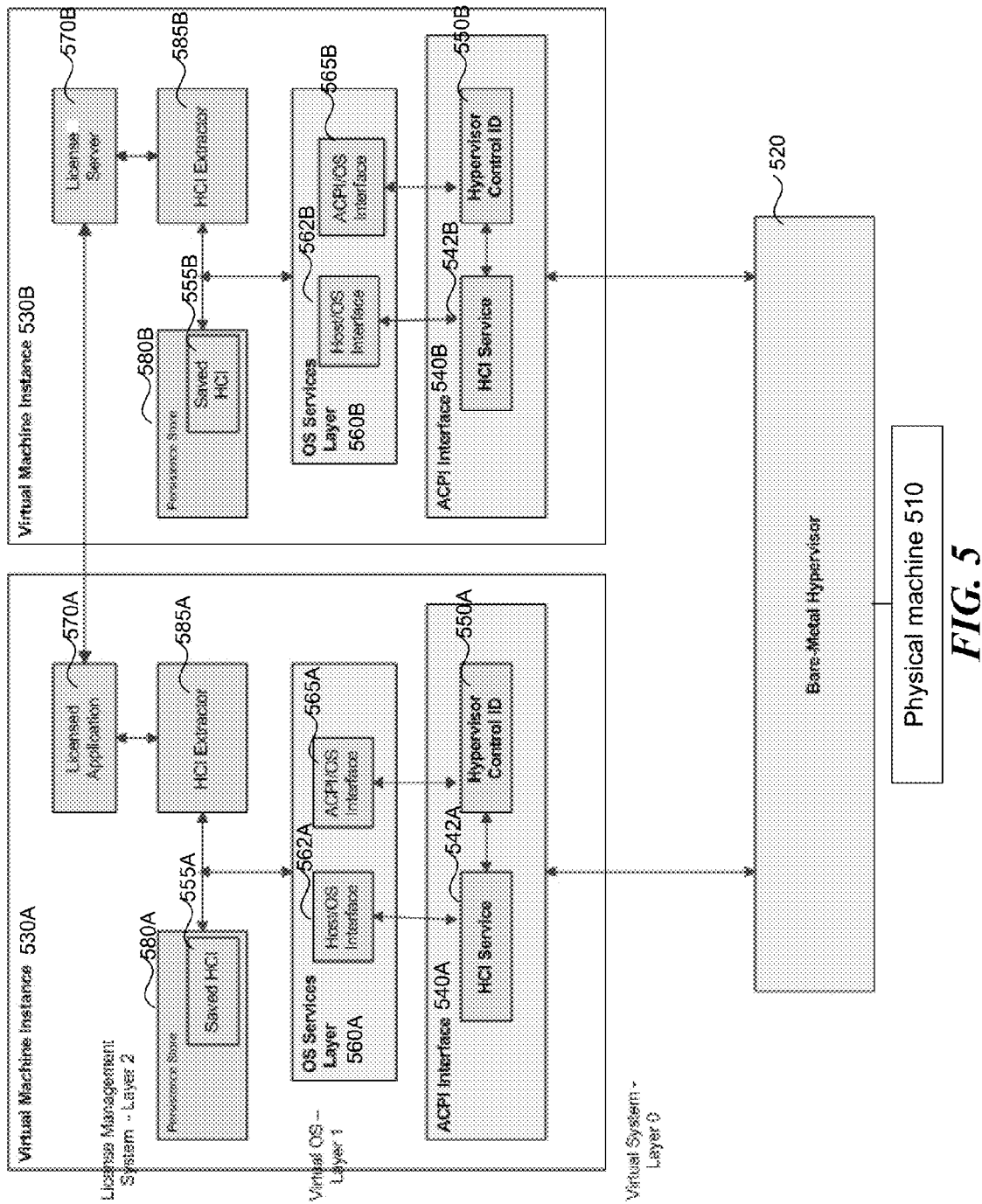
FIG. 5 is a block diagram illustrating a virtual environment including at least two virtual machines for enforcing software licenses, according to various embodiments.

FIG. 5 illustrates a virtual environment including at least two virtual machines for enforcing software licenses, according to various embodiments. FIG. 5 illustrates a bare-metal hypervisor 520 running on a physical machine 510. In some other embodiments, the hypervisor 520 can be a hosted hypervisor instead of a bare-metal hypervisor. The hypervisor 520 can be, e.g., a Microsoft Hyper-V hypervisor, a Kernel-based Virtual Machine (KVM) hypervisor, a Citrix XenServer hypervisor, or other types of hypervisor.

The hypervisor 520 creates two virtual machine instances 530A and 530B. A licensed application 570A runs on virtual machine 530A. A license server 570B runs on virtual machine 530B. In some other embodiments, there can be two different hypervisors. One of the hypervisor creates virtual machine 530A and another hypervisor creates virtual machine 530B.

At the virtual system layer, the hypervisor 520 tracks the virtual machine instances for different operations. The hypervisor 520 can detect virtual machine operations and events via, e.g., application programming interface (API) of the hypervisor 520. For example, for a virtual machine migration operation, the hypervisor 520 determines that no new virtual machine instance is created and generates no new identifier. If there is a creation or clone or snapshot operation, the hypervisor 520 determines that a new virtual machine instance is created in the virtual environment 500 and then generates a new identifier to be assigned to the new instance. The unique identifier can be, e.g., a Microsoft virtual machine generation identifier generated by Microsoft Hyper-V. Depending on the operating systems of the virtual machines and the type of hypervisor, the hypervisor 520 can choose difference mechanism to generate unique identifiers for virtual machine instances.

The hypervisor 520 injects an HCI virtual device 550A containing the newly generated unique identifier 555A to a system namespace of the virtual machine 530A, called Advanced Configuration and Power Interface (ACPI) 540A, when the hypervisor 520 creates the virtual machine instance 530A. In other words, the virtual machine instance 530A loads up the HCI virtual device 550A, when the virtual machine instance 530A starts up running for the first time and every time afterwards. In some other embodiments, the system namespace can be other type of namespace other than ACPI. In some embodiments, the HCI virtual device 550A is created using ACPI Source Language (ASL).

The virtual device 550A includes a hypervisor control ID (HCI) 555A, which is the unique identifier generated by the hypervisor 520. When the operating system of the virtual machine 530A boots up, the operating system initializes and loads up the virtual device 550A. The ACPI interface 540A of virtual machine 530A further runs a HCI (hypervisor control ID) service 542A, as a kernel mode service to provide service level calls related to the HCI virtual device 550A.

At the OS services layer 560A, there is a host/OS interface 562A responsible for communicating with the HCI service 542A, and an ACPI/OS interface 565A responsible for communicating with the HCI virtual device 550A. Applications running on the virtual machine 530A can access the HCI virtual device 550A via the host/OS interface 562A and the ACPI/OS interface 565A. For example, an application 585A called HCI extractor can access the HCI virtual device 550 and retrieves the hypervisor control ID (HCI) 555A. The HCI extractor 585A then saves the HCI 555A in a virtual persistence store 580A. In some embodiments, the HCI extractor 585A is part of an inventory tracking system or a license management system.

The licensed application 570A can use the HCI 555A stored in the virtual persistence store 580A as the unique identifier of the virtual machine instance 530A on which the licensed application 570A runs. The licensed application 570A can either retrieve the HCI 555A from the virtual persistence store 580A directly, or via the HCI extractor 585A.

The licensed application 570A retrieves and stores a first instance of the HCI 555A when the licensed application 570A runs legitimately on the virtual machine 530A under a license. In order to check whether the license is still valid, the licensed application 570A will retrieves and stores a second instance of the HCI 555A from the virtual device 550A in a future point of time. If the first and second instances of the HCI 555A are different, the licensed application 570A determines a time shift event such as cloning has occurred. In other words, the licensed application 570A now runs on a cloned virtual machine instead of an original virtual machine. The licensed application 570A needs to contact a server of the inventory tracking system or the licensing management system, e.g., the licensed server 570B, to determine whether the virtual machine 530A still has a valid license to run the licensed application 570A.

Similarly, a license server 570B runs on another virtual machine 530B managed by the hypervisor 520. The hypervisor injects another unique identifier (i.e., HCI) 555B into the virtual device 550B of ACPI interface 540B. An HCI extractor 585B can extract the HCI 555B from the virtual device 550B and stores the HCI 55B in virtual persistence store 580B. The license server 570B can either retrieve the HCI 555B from the virtual persistence store 580B directly, or via the HCI extractor 585B.

The license server 570B can use the saved HCI 555B stored in the virtual persistence store 580B as the unique identifier of the virtual machine instance 530B on which the license server 570B runs. The license server 570B retrieves and stores a first instance of the HCI 555B when the license server 570B runs on the virtual machine 530B. In order to check whether the virtual machine is reverted to a snapshot, the license server 570B will retrieves and stores a second instance of the HCI 555B from the virtual device 550B in a future point of time. If the first and second instances of the HCI 555B are different, the license server 570B determines a time shift event, such as reverting the virtual server to a previous point in time, has occurred. In other words, the license server 570B now runs on a reverted virtual machine based on a snapshot instead of an original virtual machine. The license server 570B needs to contact the inventory tracking system or the licensing management system, to determine whether the license(s) stored in the virtual machine 530B are not obsolete and still available for the license server 570B to grant properly to machines.

Figure 6:
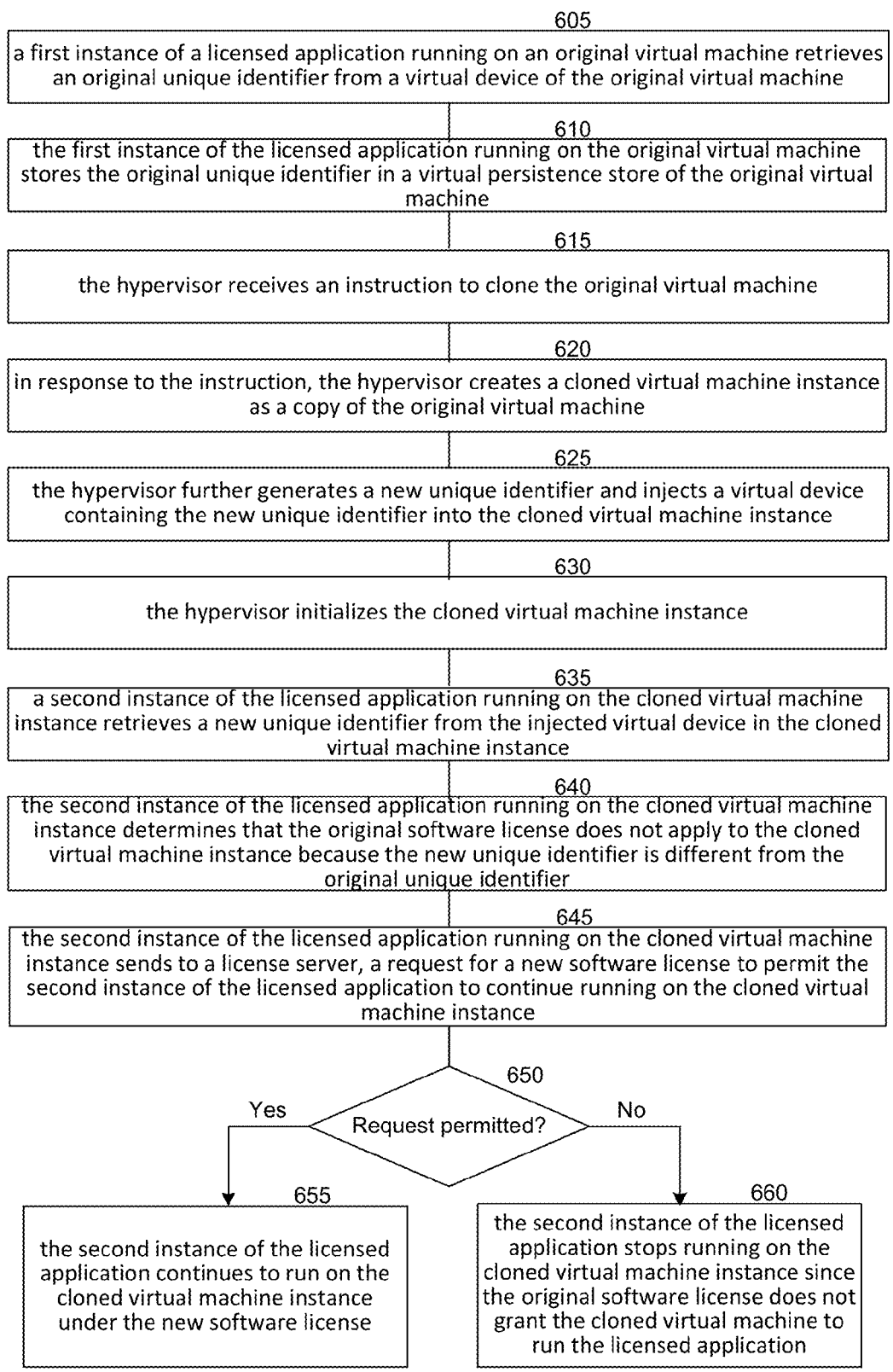
FIG. 6 is a flow diagram illustrating a sample process of preventing software licensing exploitation in a virtual environment, according to various embodiments.

FIG. 6 illustrates a sample process of preventing software licensing exploitation in a virtual environment, according to various embodiments. Particularly, the process 600 prevents licensing exploitation using clones of virtual machines. A hypervisor manages and monitors one or more virtual machines running in the virtual environment. The hypervisor can be, e.g., a bare-bone hypervisor directly running on top of a hardware machine, or a hosted hypervisor running on top of an operating system.

At step 605 of the process 600, a first instance of a licensed application running on an original virtual machine retrieves an original unique identifier from a virtual device of the original virtual machine. The original unique identifier uniquely identifies the original virtual machine. The first instance of the licensed application runs on the original virtual machine as permitted by an original software license.

At step 610, the first instance of the licensed application running on the original virtual machine stores the original unique identifier in a virtual persistence store of the original virtual machine. The original unique identifier will be available to the original virtual machine, as well as copies of the original virtual machine since those copies of the original virtual machine also include copies of the virtual persistence store.

At step 615, the hypervisor receives an instruction to clone the original virtual machine. An instruction to clone a virtual machine is different from an instruction to migrate a virtual machine for license enforcement purpose. A migrated virtual machine is treated as the same virtual machine instance as the original virtual machine; while the cloned virtual machine is treated as a different virtual machine instance from the original virtual machine, and therefore needs a separate software license.

At step 620, in response to the instruction, the hypervisor creates a cloned virtual machine instance as a copy of the original virtual machine. As a copy, the cloned virtual machine instance includes the virtual persistence store storing the original unique identifier. At step 625, the hypervisor further generates a new unique identifier and injects a virtual device containing the new unique identifier into the cloned virtual machine instance. The hypervisor conducts the injection before the cloned virtual machine instance initializes for the first time. The hypervisor continues to manage both the existing virtual machine and the new virtual machine instance.

In some embodiments, the hypervisor generates a random or pseudo-random number as the new unique identifier for the uniquely identifying the new virtual machine instance. The random or pseudo-random number have enough random bits to guarantee a uniqueness for the new virtual machine instance against identifiers for virtual machines instances across all hypervisors in the world.

At step 630, the hypervisor initializes the cloned virtual machine instance. At step 635, a second instance of the licensed application running on the cloned virtual machine instance retrieves a new unique identifier from the injected virtual device in the cloned virtual machine instance. The new unique identifier uniquely identifies the cloned virtual machine instance.

At step 640, the second instance of the licensed application running on the cloned virtual machine instance determines that the original software license does not apply to the cloned virtual machine instance because the new unique identifier is different from the original unique identifier.

At step 645, the second instance of the licensed application running on the cloned virtual machine instance sends to a license server, a request for a new software license to permit the second instance of the licensed application to continue running on the cloned virtual machine instance.

At decision block 650, the second instance of the licensed application determines whether the license server permits the request for the new software license. If the license server permits the request, at step 655, the second instance of the licensed application continues to run on the cloned virtual machine instance under the new software license. If the license server denies the request for the new software license, at step 660, the second instance of the licensed application stops running on the cloned virtual machine instance since the original software license does not grant the cloned virtual machine to run the licensed application.

Figure 7:
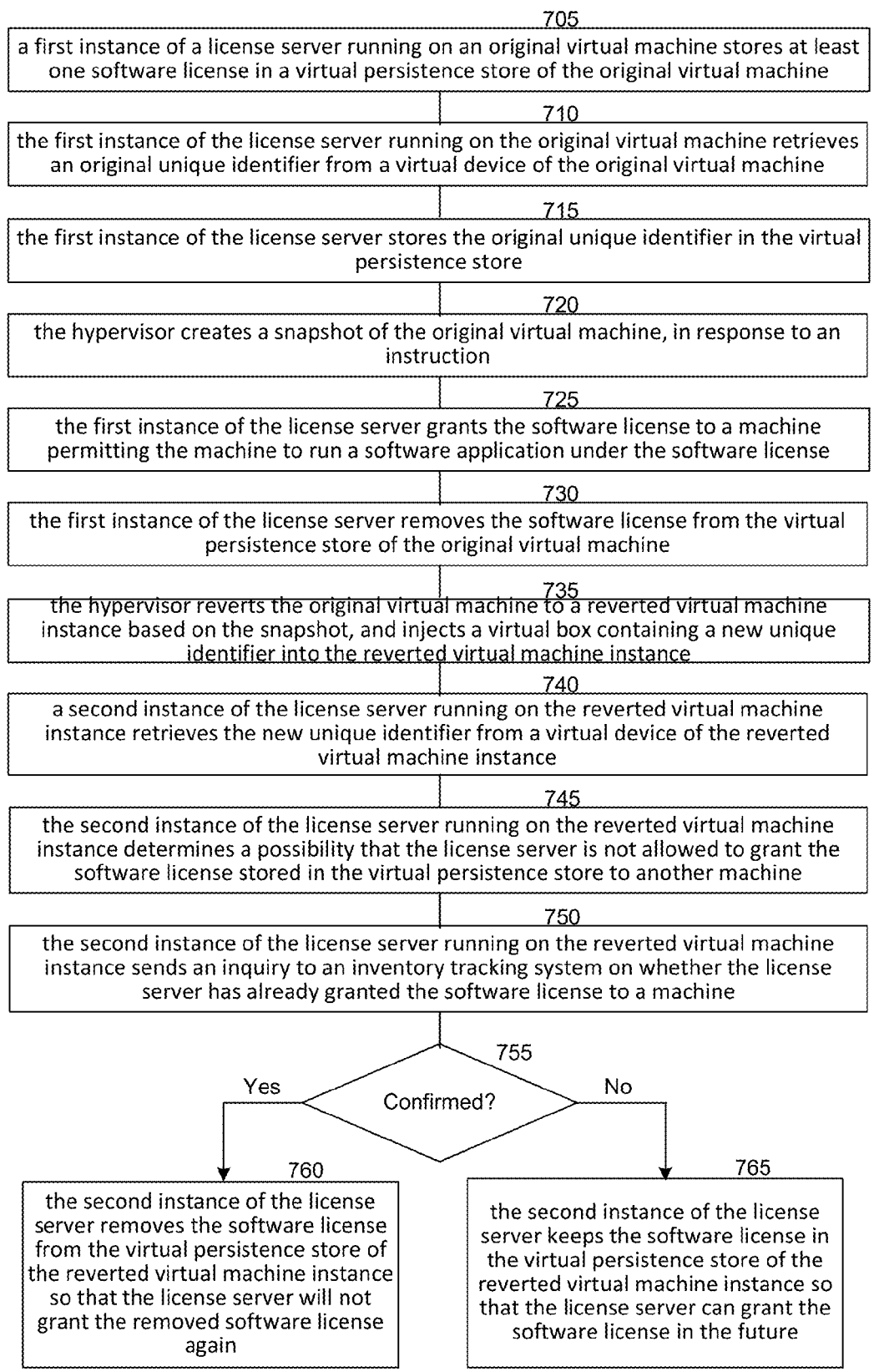
FIG. 7 is a flow diagram illustrating another sample process of preventing software licensing exploitation in a virtual environment, according to various embodiments.

FIG. 7 illustrates another sample process of preventing software licensing exploitation in a virtual environment, according to various embodiments. Particularly, the process 700 prevents licensing exploitation by reverting back virtual machines using snapshots.

At step 705 of the process 700, a first instance of a license server running on an original virtual machine stores at least one software license in a virtual persistence store of the original virtual machine. The license server can grant a machine (either a hardware machine or a virtual machine) the software license by sending the software license information to that machine. After granting the license, the license server removes the software license from the virtual persistence store so that the license server cannot grant the same software license twice.

At step 710, the first instance of the license server running on the original virtual machine retrieves an original unique identifier from a virtual device of the original virtual machine. The original unique identifier uniquely identifying the original virtual machine. The hypervisor of the virtual environment has injected the virtual device into the original virtual machine, when the hypervisor created the original virtual machine. At step 715, the first instance of the license server stores the original unique identifier in the virtual persistence store.

At step 720, the hypervisor creates a snapshot of the original virtual machine, in response to an instruction. The snapshot is a copy of the original virtual machine recording the state of the original virtual machine at the point of time when the snapshot is created.

After the hypervisor creates the snapshot of the original virtual machine, at step 725, the first instance of the license server grants the software license to a machine permitting the machine to run a software application under the software license. At step 730, the first instance of the license server removes the software license from the virtual persistence store of the original virtual machine.

At step 735, the hypervisor reverts the original virtual machine to a reverted virtual machine instance based on the snapshot, and injects a virtual box containing a new unique identifier into the reverted virtual machine instance. The virtual persistence store of the reverted virtual machine instance still stores the original unique identifier as well as the software license, while the original virtual machine before reversion has already removed the software license from the virtual persistence store of the original virtual machine as in step 730.

At step 740, a second instance of the license server running on the reverted virtual machine instance retrieves the new unique identifier from a virtual device of the reverted virtual machine instance. The new unique identifier uniquely identifying the reverted virtual machine instance.

At step 745, the second instance of the license server running on the reverted virtual machine instance determines a possibility that the license server is not allowed to grant the software license stored in the virtual persistence store to another machine, because the new unique identifier is different from the original unique identifier. In other words, if the reverted virtual machine instance is a different instance from the original virtual machine, there is a possibility that the license server running on the original virtual machine had already granted the software license and removed the software license from the virtual persistence store, before the snapshot was created.

At step 750, the second instance of the license server running on the reverted virtual machine instance sends an inquiry to an inventory tracking system on whether the license server has already granted the software license to a machine. At decision block 755, the second instance of the license server determines whether the inventory tracking system confirms that the license server has already granted the software license. In some other embodiments, the second instance of the license server can determine whether the license server has already granted the software license by directly contacting the machines (either hardware machines or virtual machines) to confirm whether one of the machines has already used that software license.

If the license server has already granted the software license, at step 760, the second instance of the license server removes the software license from the virtual persistence store of the reverted virtual machine instance so that the license server will not grant the removed software license again. If the license server has not granted the software license yet, at step 765, the second instance of the license server keeps the software license in the virtual persistence store of the reverted virtual machine instance so that the license server can grant the software license in the future.

Figure 8:
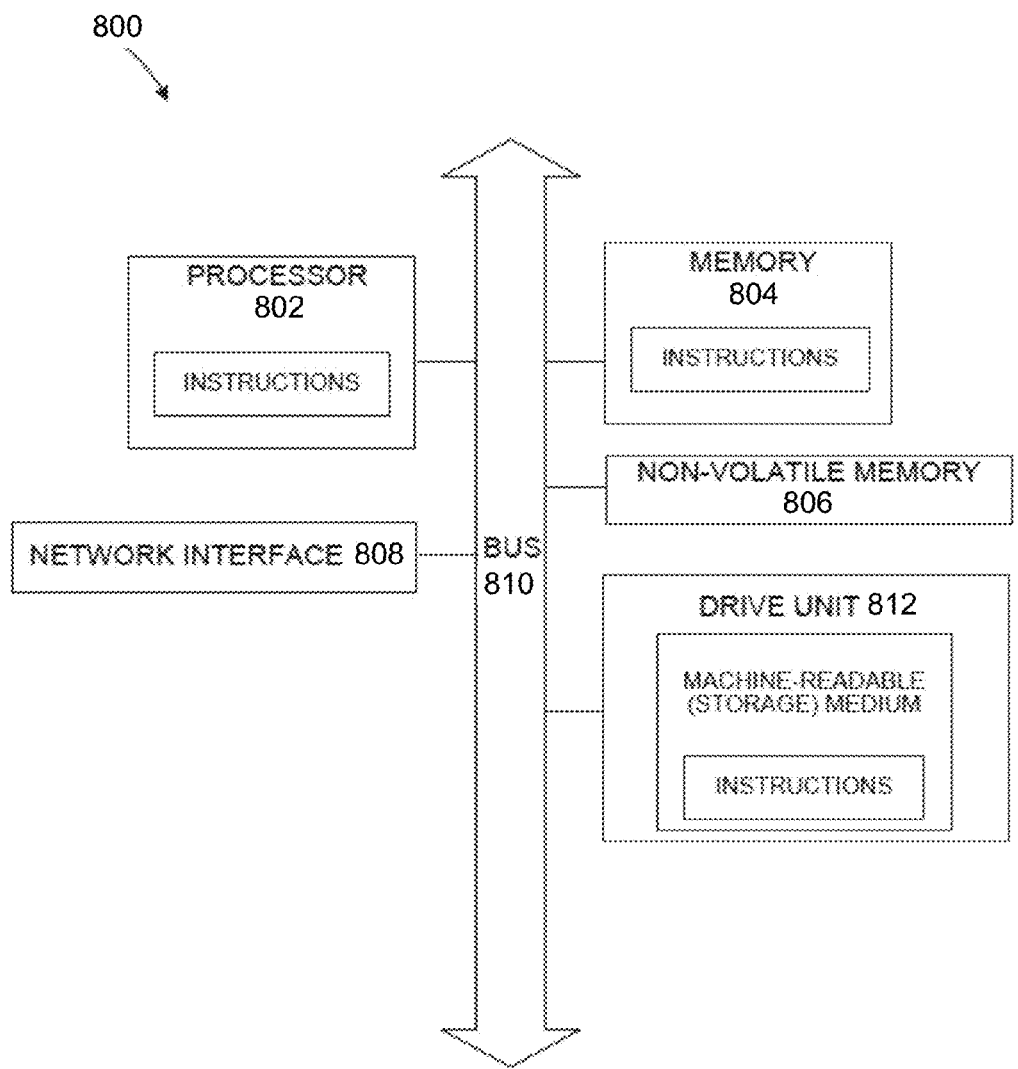
FIG. 8 is a diagrammatic representation of a machine in the example form of a computer system within which a set of instructions, for causing the machine to perform any one or more of the methodologies or modules discussed herein, may be executed.

FIG. 8 is a block schematic diagram that depicts a machine in the exemplary form of a computer system 800, within which a set of instructions for causing the machine to perform any of the herein disclosed methodologies (e.g., FIGS. 7-8) may be executed. For example, the computer system 800 can be the physical machine 210 or 510 upon which the hypervisor and virtual machines run. In some embodiments, the computer system 800 may include a network router, a network switch, a network bridge, personal digital assistant (PDA), a cellular telephone, a Web appliance or any machine capable of executing or transmitting a sequence of instructions that specify actions to be taken. The computer system 800 is intended to illustrate a hardware device on which any of the instructions, processes, modules and components depicted in the figures above (and any other processes, techniques, modules and/or components described in this specification) can be implemented. As shown, the computer system 800 includes a processor 802, memory 804, non-volatile memory 806, and a network interface 808. Various common components (e.g., cache memory) are omitted for illustrative simplicity. The computer system 800 can be of any applicable known or convenient type, e.g., a personal computer (PC), server-class computer or mobile device (e.g., smartphone, card reader, tablet computer, etc.). The components of the computer system 800 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 802. The memory 804 is coupled to the processor 802 by, for example, a bus 810. The memory 804 can include, by way of example but not limitation, random access memory (RAM), e.g., dynamic RAM (DRAM) and static RAM (SRAM). The memory 804 can be local, remote, or distributed.

The bus 810 also couples the processor 802 to the non-volatile memory 806 and drive unit 812. The non-volatile memory 806 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 806 can be local, remote, or distributed.

The data structures, modules, and instruction steps described in the figures above may be stored in the non-volatile memory 806, the drive unit 812, or the memory 804. The processor 802 may execute one or more of the modules stored in the memory components.

The bus 810 also couples the processor 802 to the network interface 808. The network interface 808 can include one or more of a modem or network interface. A modem or network interface can be considered to be part of the computer system 800. The network interface 808 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification.

What is claimed is:

1. A computer-implemented method of preventing software licensing exploitation in a virtual environment, comprising:
   retrieving, by a first instance of a licensed application running on an original virtual machine as permitted by an original software license, an original unique identifier from a virtual device in the original virtual machine, the original unique identifier uniquely identifying the original virtual machine;
   creating, by a hypervisor of the virtual environment, a cloned virtual machine instance as a copy of the original virtual machine in response to a time shift operation request, wherein the time shift operation request is a snapshot request involving creating the cloned virtual machine instance as a point-of-time snapshot of the original virtual machine;
   retrieving, by a second instance of the licensed application running on the cloned virtual machine instance, a new unique identifier from a virtual device in the cloned virtual machine instance, the new unique identifier uniquely identifying the cloned virtual machine instance;
   determining, by the second instance of the licensed application running on the cloned virtual machine instance, that the original software license does not apply to the cloned virtual machine instance because the new unique identifier is different from the original unique identifier;
   storing, by the first instance of the license application running on the original virtual machine, one or more software licenses in a virtual persistence store of the original virtual machine;
   before the hypervisor receives the snapshot request, retrieving, by the license application running on the original virtual machine, an original unique identifier from a virtual device of the original virtual machine, the original unique identifier uniquely identifying the original virtual machine;
   storing the original unique identifier in the virtual persistence store of the original virtual machine;
   granting, by the license application running on the original virtual machine, a software license to a virtual machine instance by reducing a number of the software licenses stored in the virtual persistence store of the original virtual machine;
   reverting, by the hypervisor, the original virtual machine back to the point-of-time snapshot;
   determining, by the license application running on the cloned virtual machine instance as the clone of the original virtual machine, that the new unique identifier for the new virtual machine instance is different from the original unique identifier for the original virtual machine; and
   determining, by the license application running on the new virtual machine instance, at least one of the software licenses stored in a virtual persistence store of the new virtual machine instance has already been granted and therefore cannot be granted again.

2. The computer-implemented method of claim 1, further comprising:
   sending, from the second instance of the licensed application running on the cloned virtual machine instance to a license server, a request for a new software license to permit the second instance of the licensed application to continue running on the cloned virtual machine instance; and
   in an event that the license server denies the request for the new software license, stopping the second instance of the licensed application from running on the cloned virtual machine instance.

3. The computer-implemented method of claim 1, further comprising:
   receiving, by the hypervisor of the virtual environment, an instruction to clone the original virtual machine; and
   in response to the instruction, generating the new unique identifier and injecting the virtual device containing the new unique identifier into the cloned virtual machine instance, before the cloned virtual machine instance initializes for the first time.

4. The computer-implemented method of claim 1, further comprising:
   storing, by the first instance of the licensed application running on the original virtual machine, the original unique identifier in a virtual persistence store of the original virtual machine.

5. The computer-implemented method of claim 4, wherein the cloned virtual machine instance includes the virtual persistence store storing the original unique identifier.

6. A computer-implemented method of preventing software licensing exploitation in a virtual environment, comprising:
   storing, by a first instance of a license server running on an original virtual machine, at least one software license in a virtual persistence store of the original virtual machine;
   retrieving, by the first instance of the license server running on the original virtual machine, an original unique identifier from a virtual device of the original virtual machine, the original unique identifier uniquely identifying the original virtual machine;
   creating, by a hypervisor of the virtual environment, a snapshot of the original virtual machine, in response to a time shift operation request, wherein the time shift operation request is a snapshot request involving creating a cloned virtual machine instance as a point-of-time snapshot of the original virtual machine;
   reverting, by the hypervisor of the virtual environment, the original virtual machine to a reverted virtual machine instance based on the snapshot;
   retrieving, by a second instance of the license server running on the reverted virtual machine instance, a new unique identifier from a virtual device of the reverted virtual machine instance, the new unique identifier uniquely identifying the reverted virtual machine instance; and determining, by the second instance of the license server running on the reverted virtual machine instance, a possibility that the license server is not allowed to grant the software license stored in the virtual persistence store to another machine, because the new unique identifier is different from the original unique identifier;

storing, by the first instance of the license server running on the original virtual machine, one or more software licenses in a virtual persistence store of the original virtual machine;

before the hypervisor receives the snapshot request, retrieving, by the license server running on the original virtual machine, an original unique identifier from a virtual device of the original virtual machine, the original unique identifier uniquely identifying the original virtual machine;

storing the original unique identifier in the virtual persistence store of the original virtual machine;

granting, by the license server running on the original virtual machine, a software license to a virtual machine instance by reducing a number of the software licenses stored in the virtual persistence store of the original virtual machine;

reverting, by the hypervisor, the original virtual machine back to the point-of-time snapshot;

determining, by the license server running on the cloned virtual machine instance as the clone of the original virtual machine, that the new unique identifier for the new virtual machine instance is different from the original unique identifier for the original virtual machine; and determining, by the license server running on the new virtual machine instance, at least one of the software licenses stored in a virtual persistence store of the new virtual machine instance has already been granted and therefore cannot be granted again.

7. The computer-implemented method of claim 6, further comprising:

sending, by the second instance of the license server running on the reverted virtual machine instance, an inquiry to an inventory tracking system on whether the license server has already granted the software license to a machine; and in an event that the inventory tracking system replies that the license server has already granted the software license to a machine, removing the software license from the virtual persistence store of the reverted virtual machine instance so that the license server will not grant the removed software license again.

8. The computer-implemented method of claim 6, further comprising:

after the hypervisor creates the snapshot of the original virtual machine, granting, by the first instance of the license server, the software license to a machine permitting the machine to run a software application under the software license; and before the hypervisor reverts the original virtual machine to the reverted virtual machine instance based on the snapshot, removing the software license from the virtual persistence store of the original virtual machine.

9. The computer-implemented method of claim 8, wherein the virtual persistence store of the reverted virtual machine instance still stores the software license, while the original virtual machine before reversion has already removed the software license from the virtual persistence store of the original virtual machine.

10. A computer-implemented method of monitoring and enforcing software licenses in a virtual environment, comprising:

receiving, by a hypervisor of the virtual environment, a time shift operation request involving creating a new virtual machine instance of an existing virtual machine, wherein the time shift operation request is a snapshot request involving creating the new virtual machine instance as a point-of-time snapshot of the existing virtual machine;

in response to the time shift operation, generating a new unique identifier for uniquely identifying the new virtual machine instance among virtual machine instances across the world;

creating, by the hypervisor, the new virtual machine instance, the new virtual machine instance including a virtual device containing the new unique identifier; and retrieving, by a licensed application or a license server running on the new virtual machine instance, the new unique identifier from the virtual device to determine whether new virtual machine instance is the same virtual machine as the existing virtual machine for software license enforcement purpose;

storing, by an instance of the license server running on the existing virtual machine, one or more software licenses in a virtual persistence store of the existing virtual machine;

before the hypervisor receives the snapshot request, retrieving, by the license server running on the existing virtual machine, an original unique identifier from a virtual device of the existing machine, the original unique identifier uniquely identifying the existing virtual machine;

storing the original unique identifier in the virtual persistence store of the existing virtual machine;

granting, by a license server running on the existing virtual machine, a software license to a virtual machine instance by reducing a number of the software licenses stored in the virtual persistence store of the existing virtual machine;

reverting, by the hypervisor, the existing virtual machine back to the point-of-time snapshot;

determining, by the license server running on the new virtual machine instance as the clone of the existing virtual machine, that the new unique identifier for the new virtual machine instance is different from the original unique identifier for the existing virtual machine; and determining, by the license server running on the new virtual machine instance, at least one of the software licenses stored in a virtual persistence store of the new virtual machine instance has already been granted and therefore cannot be granted again.

11. The computer-implemented method of claim 10, wherein the time shift operation request is a clone request involving creating the new virtual machine instance as a clone of the existing virtual machine.

12. The computer-implemented method of claim 11, further comprising:

before the hypervisor receives the clone request, retrieving, by an instance of the licensed application running on the existing virtual machine, an original unique identifier from a virtual device of the existing virtual machine, the original unique identifier uniquely identifying the existing virtual machine;

storing the original unique identifier in a virtual persistence store of the existing virtual machine;

after the hypervisor creates the new virtual machine instance, determining, by the licensed application running on the new virtual machine instance as the clone of the existing virtual machine, that the new unique identifier for the new virtual machine instance is different from the original unique identifier for the existing virtual machine; and communicating, by the licensed application, with a licensing management system to determine whether the licensed application is permitted to run on the new virtual machine instance under a proper software license.

13. The computer-implemented method of claim 10, further comprising: communicating, by the license server, with a licensing management system to identify one or more software licenses that are stored in the virtual persistence store of the new virtual machine instance and that have not been granted by the license server to virtual machine instances or physical machines.

14. The computer-implemented method of claim 10, wherein the time shift operation request is not a request for migrating the existing virtual machine, and the hypervisor does not generate a unique identifier in response to a request for migrating the existing virtual machine.

15. The computer-implemented method of claim 10, wherein the hypervisor generates a random or pseudo-random number as the new unique identifier for the uniquely identifying the new virtual machine instance, the random or pseudo-random number having enough random bits to guarantee a uniqueness for the new virtual machine instance against identifiers for virtual machines instances across all hypervisors in the world.

16. The computer-implemented method of claim 10, wherein the new unique identifier uniquely identifies the new virtual machine instance among virtual machine instances managed by the hypervisor.

17. The computer-implemented method of claim 10, wherein the step of creating the new virtual machine instance comprises:

creating, by the hypervisor, the new virtual machine instance and a virtual device containing the new unique identifier; and injecting the virtual device into the new virtual machine instance, before the new virtual machine instance initializes in the virtual environment for the first time.

18. The computer-implemented method of claim 10, wherein the new unique identifier uniquely identifies the new virtual machine instance among virtual machine instances across the world.

19. The computer-implemented method of claim 10, wherein the hypervisor manages both the existing virtual machine and the new virtual machine instance.

20. The computer-implemented method of claim 10, wherein the hypervisor is a bare-bone hypervisor or a hosted hypervisor.

21. A computing device, comprising:
one or more processors;
a hypervisor configured to create and manage one or more virtual machine instances running on the hypervisor using the one or more processors;
a memory storing executable instructions, when executed by the processor, is configured to perform a process of:

receiving, by the hypervisor, a time shift operation request involving creating a new virtual machine instance of an existing virtual machine, wherein the time shift operation request is a snapshot request;

in response to the time shift operation, generating a new unique identifier for uniquely identifying the new virtual machine instance among one or more virtual machine instances managed by the hypervisor;

creating, by the hypervisor, the new virtual machine instance as reverting an existing virtual machine back to a point-of-time state based on a snapshot, the new virtual machine instance including a virtual device containing the new unique identifier;

retrieving, by a licensed application or a license server running on the new virtual machine instance, the new unique identifier from the virtual device to determine whether new virtual machine instance is the same virtual machine as the existing virtual machine for software license enforcement purpose;

storing, by an instance of the license server running on the existing virtual machine, at least one software license in a virtual persistence store of the existing virtual machine;

before the hypervisor receives the snapshot request, retrieving, by the license server running on the existing virtual machine, an original unique identifier from a virtual device of the existing machine, the original unique identifier uniquely identifying the existing virtual machine;

storing the original unique identifier in the virtual persistence store of the existing virtual machine;

granting, by a license server running on the existing virtual machine, the software license to a virtual machine instance, and removing the software license from the virtual persistence store of the existing virtual machine;

determining, by the license server running on the new virtual machine instance as a reverted copy of the existing virtual machine based on the snapshot, that the new unique identifier for the new virtual machine instance is different from the original unique identifier for the existing virtual machine; and determining, by the license server running on the new virtual machine instance, a possibility that the license server is not allowed to grant the software license stored in the virtual persistence store, because the new unique identifier is different from the original unique identifier.

22. The computing device of claim 21, wherein the time shift operation request is a clone request, and the process further includes:

before the hypervisor receives the clone request, retrieving, by an instance of the licensed application running on the existing virtual machine under an original software license, an original unique identifier from a virtual device of the existing virtual machine, the original unique identifier uniquely identifying the existing virtual machine;

storing the original unique identifier in a virtual persistence store of the existing virtual machine;

after the hypervisor creates the new virtual machine instance, determining, by the licensed application running on the new virtual machine instance as the clone of the existing virtual machine, that the new unique identifier for the new virtual machine instance is different from the original unique identifier for the existing virtual machine; and determining, by the licensed application running on the new virtual machine instance, that the original software license does not permit the licensed application running on the new virtual machine instance, because the new virtual machine instance is different from the existing virtual machine.

* * * * *